Jan. 19, 1954
M. E. SMITH
2,666,275
FISHING PLUG
Filed Nov. 21, 1952
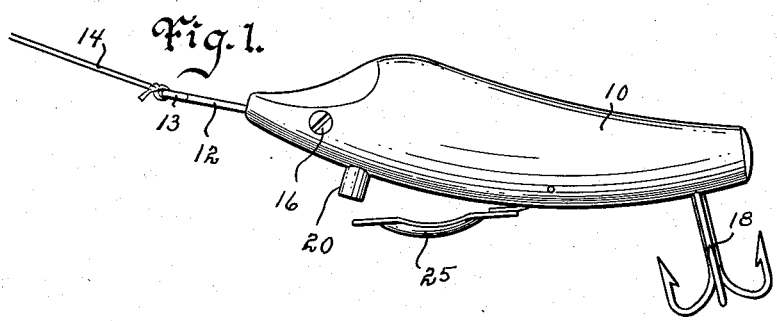
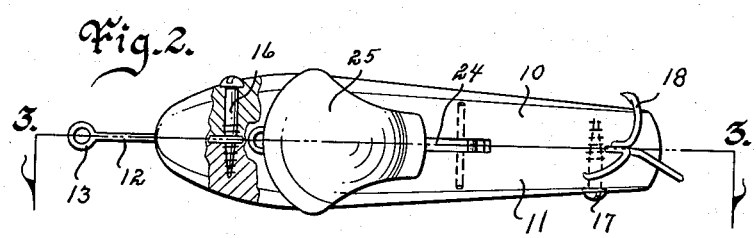
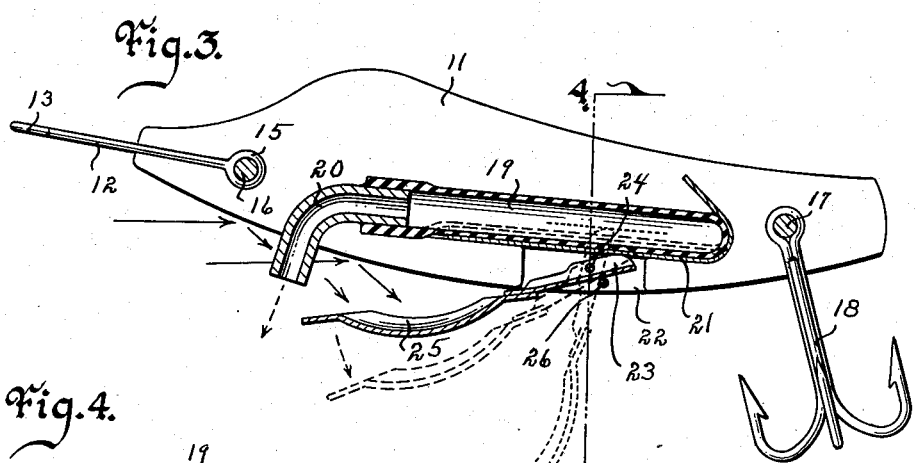
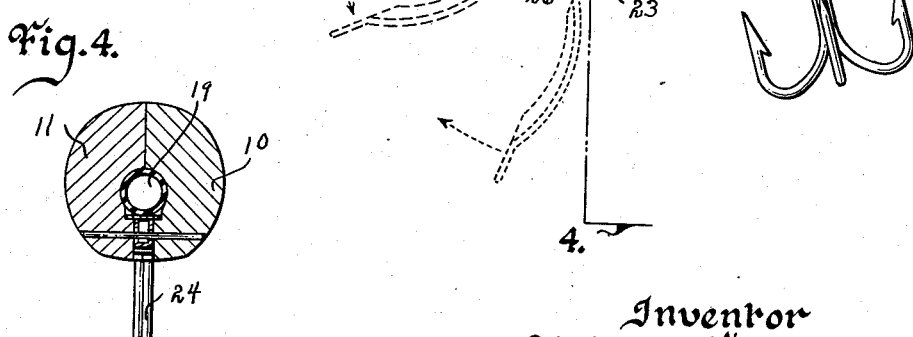
Inventor
Milton E. Smith
by Talbert Dick & Adler
Attorneys
Witness
Edward P. Seeley Patented Jan. 19, 1954

2,666,275

UNITED STATES PATENT OFFICE 2,666,275

FISHING PLUG

Milton E. Smith, Logan, Iowa

Application November 21, 1952, Serial No. 321,809

5 Claims. (Cl. 43—42.06)

This invention relates to artificial lures and more particularly to lures that are cast or trolled and adapted to be unevenly drawn through the water.

The use of casting plugs for fishing is very old. Usually such plugs are elongated to represent the general outline of a minnow or like and have a plurality of pendant hooks. The game fish to be caught is attracted to the lure either by its action in the water or its appearance. The chief objection to such lures, however, is that they give the appearance and performance of active but hard to catch baits. It is a well known fact, however, that game fish are more prone to attack a wounded or crippled minnow than one that would appear to be capable of rapid escape. Therefore, the principal object of my invention is to provide a fishing plug that simulates a wounded minnow by ejecting blood or a suitable colored fluid as it is erratically drawn through the water.

A further object of this invention is to provide a bleedable fishing plug that may be easily filled with blood or simulated blood fluid.

A still further object of my invention is to provide a bleeding fishing lure that is under the control of the fisherman as to the amount and the time of the ejected liquid.

A still further object of this invention is to provide a fishing plug that is durable in use, economical in manufacture, and refined in appearance.

These and other objects will be apparent to those skilled in the art.

My invention consists in the construction, arrangements, and combination of the various parts of the device, whereby the objects contemplated are attained as hereinafter more fully set forth, pointed out in my claims, and illustrated in the accompanying drawings, in which:

Fig. 1 is a side view of my plug ready for use,

Fig. 2 is a bottom view of the plug with a section cut away to illustrate how its two halves are secured together at its forward end and the line leader is secured to the same, Fig. 3 is an enlarged longitudinal sectional view of the plug taken on line 3—3 of Fig. 2 and more fully illustrates its construction, and Fig. 4 is a cross-sectional view of the lure taken on line 4—4 of Fig. 3.

The body of my lure consists of two longitudinal halves, 10 and 11, as shown in Fig. 2. When assembled, the body has the appearance of a fish, but it is obvious that the body may be of any desirable design or shape, and may take the appearance of a frog, insect, mouse, or like. The numeral 12 designates the line leader having a forward eye 13 for attaching a fish line 14, and an eye 15 on its rear end positioned between the two body halves. A screw 16 secures the forward end portions of the two body halves together and by passing through the eye 15, the line leader is rigidly secured to the lure as shown in Fig. 2.

The numeral 17 designates a screw for holding the rear end halves of the body together. This screw 17 also passes through the eye of the treble hook 18 and holds it to the lure. Any number of hooks may be attached to the lure body. By the use of screws or bolts or like, the two body halves may be easily taken apart or assembled together. This disassembling of the lure may be desirable at times for cleaning purposes, or repair of the internal mechanism which I will now describe in detail.

Embedded in and between the two body halves is a resilient cylindrical sack 19 of rubber or like material having one end closed and its other end connected to a discharge conduit 20. This cylindrical sack 19 has its rear end closed and is substantially the same as that of a resilient sack found in fountain pens. The discharge conduit 20 is bent at a right angle in order that its exhaust end will be on the forward bottom of the plug as shown in Fig. 3. The cylindrical sack 19 extends longitudinally of the bottom of the lure and the two halves of the body are cut away in parts to provide a retaining housing for the members 19 and 20 as shown in Fig. 3 and Fig. 4. The numeral 21 designates a leaf spring engaging the lower side of the cylindrical sack 19 and with its rear end portion bent upwardly as shown in Fig. 3. The two halves of the body are grooved to also receive between them this leaf spring 21. By the end of this leaf spring being bent and embedded as described, its rear end portion will be held against movement while that portion of its length that engages the underside of the cylindrical sack 19 may be yieldingly forced upwardly to collapse the resilient cylindrical sack. If the resilient cylindrical sack 19 is of sufficient resiliency, the member 21 need not be of spring material, but merely bendable material. This member 21 is similar to the bar that engages the ink sack of an ordinary fountain pen. The numeral 22 designates an opening in the bottom of the lure communicating with the underside of the member 21 and is formed by cutting away the lower inside of each of the halves. The numeral 23 designates a bar lever hingedly secured in the slit opening 22 by being rotatably mounted on the pin 24. This bar lever 23 normally extends forwardly and downwardly and has a spoon portion 25 on its forward end as shown in Fig. 1. This spoon portion 25 extends normally downwardly and forwardly in spaced relationship to the underside of the plug and the forward underside of the plug slopes downwardly and rearwardly, the purpose of which will later be explained. By forcing the spoon portion 25 downwardly and rearwardly as shown by dotted lines in Fig. 3, the lever 23, which extends beyond the pivot point 24 will move upwardly against the member 21, thereby flattening the resilient sack 19 and discharging the contents therein outwardly through the member 20. The numeral 26 designates a rod extending transversely through the plug to serve as a stop for limiting the downward and rear movement of the spoon 25.

The practical operation of my plug is as follows. The sack 19 is filled with any suitable liquid such as red colored water, blood or like. If chicken blood is used, it is recommended that the same be treated against congealing. To fill the sack 19, the discharge end of the member 20 may be immersed in the fluid to be used and the spoon portion 25 manually actuated in the same manner that a fountain pen is filled. Another way of filling the sack is to move the spoon portion 25 rearwardly and downwardly to collapse the tube 19 and with an oil can or like container inject the fluid into the member 20 while slowly releasing the member 25. Once the device is filled with suitable colored liquid, the lure is ready for use. By intermittently jerking the lure through the water, the water will strike the under forward bottom of the lure and be deflected against the spoon portion 25 which will cause the spoon portion to move downwardly and rearwardly. Obviously, the amount of movement of the spoon 25 will be relative to the jerking speed of the lure through the water. By the downward and rearward movement of the spoon portion, the lever portion 23 will partially collapse the resilient sack 19 discharging the colored fluid through the member 20 and into the water. This ejecting of the colored fluid will indicate to the fish desired to be caught the impression that the bait is wounded and would be easy to catch. Thus my lure not only simulates in appearance a desirable morsel to the fish, but indicates to the same that the bait is injured or wounded and could be obtained without great effort. If the fisherman wishes to draw the lure through the water without emitting the blood resembling fluid, he may do so by only moving the lure slowly through the water. A rapid jerk, however, will affect the relative position of the spoon 25 and eject a quantity of the colored fluid into the water. By the discharge end of the member 20 closely adjacent the fluctuating spoon 25, liquid from the member 20 will tend to be dissipated laterally and intermittently, giving the appearance of a bait bleeding each time its gills are opened and closed.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my fishing plug without departing from the real spirit and purpose of my invention, and it is my intention to cover by my claims, any modified forms of structure or use of mechanical equivalents which may be reasonably included within their scope.

I claim:

1. In a fish lure, a body portion, a resilient sack inside said body portion adapted to hold a liquid, a liquid exhaust member communicating with the inside of said sack and the outside atmosphere, a lever arm hinged to said body portion and in operative engagement with said resilient sack, a water contacting member secured to said lever arm and positioned outside the confines of said body portion, and at least one fish hook secured to said body portion.

2. In a fish lure, an elongated body portion having its forward bottom sloping downwardly and rearwardly, a resilient sack inside said body portion adapted to contain a liquid, a liquid exhaust member communicating with the inside of said sack and the outside atmosphere, a lever arm hinged to said body portion operatively engaging said resilient sack, a water contacting spoon on said lever arm, positioned outside the confines of said body portion, and extending downwardly and forwardly in spaced relationship to the forward bottom of said body portion that extends downwardly and rearwardly, and at least one fish hook on said body portion.

3. In a fish lure, an elongated body portion having its forward bottom sloping downwardly and rearwardly, a resilient sack inside said body portion adapted to contain a liquid, a liquid exhaust member communicating with the inside of said sack and the outside atmosphere, a lever arm hinged to said body portion operatively engaging said resilient sack, a water contacting spoon on said lever arm, positioned outside the confines of said body portion, and extending downwardly and forwardly in spaced relationship to the forward bottom of said body portion that extends downwardly and rearwardly, and at least one fish hook on said body portion; said body portion consisting of two separable halves.

4. In a fish lure, an elongated body portion having its forward bottom sloping downwardly and rearwardly, a resilient sack inside said body portion adapted to contain a liquid, a liquid exhaust member communicating with the inside of said sack and the outside atmosphere, a lever arm hinged to said body portion operatively engaging said resilient sack, a water contacting spoon on said lever arm, positioned outside the confines of said body portion, and extending downwardly and forwardly in spaced relationship to the forward bottom of said body portion that extends downwardly and rearwardly, and at least one fish hook on said body portion; said liquid exhaust member being so located as to discharge in the general vicinity of said water contacting spoon.

5. In a fish lure, an elongated body portion having its forward bottom sloping downwardly and rearwardly, a resilient sack inside said body portion adapted to contain a liquid, a liquid exhaust member communicating with the inside of said sack and the outside atmosphere, a lever arm hinged to said body portion operatively engaging said resilient sack, a leaf spring member inside said body portion and having at least a portion of its length extending between said resilient sack and said lever arm, a water contacting spoon on said lever arm, positioned outside the confines of said body portion, and extending downwardly and forwardly in spaced relationship to the forward bottom of said body portion that extends downwardly and rearwardly, and at least one fish hook on said body portion.

MILTON E. SMITH.

References Cited in the file of this patent

UNITED STATES PATENTS

| Number | Name | Date |
|---|---|---|
| 1,659,129 | Asaro | Feb. 14, 1928 |
| 2,129,245 | Stenstrom | Sept. 6, 1938 |
| 2,598,012 | Prieur | May 27, 1952 |
| 2,599,888 | Beezley et al. | June 10, 1952 |
| 2,611,996 | Garelick | Sept. 30, 1952 |